United States Patent
Romaniuk et al.

(10) Patent No.: US 12,091,361 B2
(45) Date of Patent: Sep. 17, 2024

(54) LIME-BASED CEMENT EXTENDER COMPOSITIONS, AND ASSOCIATED SYSTEMS AND METHODS

(71) Applicant: Graymont Western Canada Inc., Richmond (CA)

(72) Inventors: Nikolas Andrei Romaniuk, Edmonton (CA); Michael John Tate, Oregon, OH (US); Narain Hariharan, South Jordan, UT (US); Jared Ira Leikam, West Jordan, UT (US); Katherine Hyman, Salt Lake City, UT (US); Lucas McFarlane, Salt Lake City, UT (US); Joseph Lewis, Salt Lake City, UT (US)

(73) Assignee: Graymont Western Canada Inc., Richmond (CA)

( * ) Notice: Subject to any disclaimer, the term of this patent is extended or adjusted under 35 U.S.C. 154(b) by 0 days.

(21) Appl. No.: 18/462,334

(22) Filed: Sep. 6, 2023

(65) Prior Publication Data

US 2023/0416151 A1 Dec. 28, 2023

Related U.S. Application Data

(63) Continuation of application No. 18/087,728, filed on Dec. 22, 2022, now Pat. No. 11,919,813.

(60) Provisional application No. 63/293,513, filed on Dec. 23, 2021.

(51) Int. Cl.
| | |
|---|---|
| *C04B 28/12* | (2006.01) |
| *C04B 7/34* | (2006.01) |
| *C04B 7/52* | (2006.01) |
| *C04B 28/18* | (2006.01) |
| *C04B 111/00* | (2006.01) |
| *C04B 111/10* | (2006.01) |

(52) U.S. Cl.
CPC ............... *C04B 28/12* (2013.01); *C04B 7/34* (2013.01); *C04B 7/52* (2013.01); *C04B 28/184* (2013.01); *C04B 2111/00215* (2013.01); *C04B 2111/00724* (2013.01); *C04B 2111/10* (2013.01)

(58) Field of Classification Search
CPC .. C04B 28/12; C04B 7/34; C04B 7/52; C04B 28/184; C04B 2111/00215; C04B 2111/00724; C04B 2111/10
See application file for complete search history.

(56) References Cited

U.S. PATENT DOCUMENTS

| | | | |
|---|---|---|---|
| 2,669,542 A | 2/1954 | Dooley | |
| 3,074,860 A | 1/1963 | Shinzoh | |
| 3,861,928 A | 1/1975 | Slater | |
| 3,948,830 A * | 4/1976 | Donnelly | C08K 3/36 523/447 |
| 4,196,068 A | 4/1980 | Scoville | |
| 4,654,135 A | 3/1987 | Yamamoto | |
| 4,749,453 A | 6/1988 | Harris | |
| 5,572,938 A | 11/1996 | Leger | |
| 5,584,926 A | 12/1996 | Borgholm et al. | |
| 5,853,685 A | 12/1998 | Erickson | |
| 7,534,411 B2 | 5/2009 | Shapira et al. | |
| 7,799,128 B2 | 9/2010 | Guynn et al. | |
| 7,972,432 B2 | 7/2011 | Guynn et al. | |
| 7,993,500 B2 | 8/2011 | Gilliam et al. | |
| 8,323,399 B2 | 12/2012 | Guynn et al. | |
| 8,357,270 B2 | 1/2013 | Gilliam et al. | |
| 8,377,201 B2 | 2/2013 | Guynn et al. | |
| 8,414,700 B2 | 4/2013 | Guynn et al. | |
| 8,551,245 B2 | 10/2013 | Guynn et al. | |
| 8,974,593 B2 | 3/2015 | Guynn et al. | |
| 9,067,824 B1 | 6/2015 | Hansen et al. | |
| 9,102,567 B1 | 8/2015 | Hansen et al. | |
| 9,200,375 B2 | 12/2015 | Gilliam et al. | |
| 9,238,591 B2 | 1/2016 | Guynn et al. | |
| 9,272,953 B2 | 3/2016 | Guynn et al. | |
| 9,297,082 B2 | 3/2016 | Licht | |
| 9,718,731 B2 | 8/2017 | Bullerjahn et al. | |
| 9,957,196 B1 | 5/2018 | Guynn | |

(Continued)

FOREIGN PATENT DOCUMENTS

| | | | | |
|---|---|---|---|---|
| CN | 106966620 A * | 7/2017 | ............... | C04B 7/26 |
| CN | 108117356 A | 6/2018 | | |

(Continued)

OTHER PUBLICATIONS

Kaid et al "Durability of concrete containing a natural pozzolan as defined by a performance-based approach", Construction and Building Materials 23. pp. 3457-2467. (Year: 2009).*

(Continued)

*Primary Examiner* — Anthony J Green

(74) *Attorney, Agent, or Firm* — Perkins Coie LLP

(57) ABSTRACT

A composition configured to be mixed with cement, and associated systems and methods are disclosed herein. In some embodiments, the composition includes at least 10% by weight lime particles, and at least 35% by weight pozzolan particles. Properties of the composition can include a magnesium oxide concentration of at least 0.5%, and an iron oxide concentration of at least 0.5-2.0%, an aluminum oxide concentration of 2-8%, a silicon dioxide concentration of 20-40%, a potassium oxide concentration of 20,000-30,000 ppm, and a sodium oxide concentration of 10,000-20,000 ppm. In some embodiments, the lime-based cement extender composition, or product, is combined with cement to produce a cement blend for use in the mining industry as mine backfill.

17 Claims, 4 Drawing Sheets

(56) References Cited

U.S. PATENT DOCUMENTS

| | | |
|---|---|---|
| 10,131,575 B2 | 11/2018 | Guynn |
| 10,233,116 B1 | 3/2019 | Guynn |
| 10,315,956 B2 | 6/2019 | Morrison et al. |
| 10,494,298 B1 | 12/2019 | Guynn |
| 10,526,248 B2 | 1/2020 | Guynn |
| 10,730,805 B2 | 8/2020 | Guynn |
| 10,737,980 B2 | 8/2020 | Guynn |
| 10,968,137 B1 | 4/2021 | Guynn |
| 11,168,029 B2 | 11/2021 | Guynn |
| 11,472,737 B1 | 10/2022 | Guynn |
| RE49,415 E | 2/2023 | Guynn et al. |
| 2008/0124269 A1 | 5/2008 | Daudey |
| 2008/0245660 A1 | 10/2008 | Little et al. |
| 2010/0068109 A1 | 3/2010 | Comrie |
| 2010/0101955 A1 | 4/2010 | Nocera et al. |
| 2010/0154593 A1 | 6/2010 | Ralchev et al. |
| 2011/0044882 A1 | 2/2011 | Buckley et al. |
| 2011/0182786 A1 | 7/2011 | Burba |
| 2012/0121491 A1 | 5/2012 | Rau |
| 2012/0145046 A1 | 6/2012 | Hansen et al. |
| 2013/0112115 A1 | 5/2013 | Sotillo et al. |
| 2014/0010743 A1 | 1/2014 | Kosmoski |
| 2015/0343373 A1 | 12/2015 | Balfe et al. |
| 2016/0137551 A1 | 5/2016 | Le Gouil et al. |
| 2017/0022110 A1 | 1/2017 | Ulrike et al. |
| 2018/0037501 A1 | 2/2018 | Guynn et al. |
| 2018/0148628 A1 | 5/2018 | Vlasopoulos et al. |
| 2018/0251403 A1 | 9/2018 | Boehringer et al. |
| 2018/0305254 A1 | 10/2018 | Ben Haha |
| 2019/0040347 A1 | 2/2019 | Kim et al. |
| 2019/0218445 A1 | 7/2019 | Pernites et al. |
| 2020/0123054 A1 | 4/2020 | Guynn |
| 2021/0147296 A1 | 5/2021 | Byrd |
| 2021/0179492 A1 | 6/2021 | Hoffmann |
| 2021/0292231 A1 | 9/2021 | Alanqari et al. |
| 2021/0309570 A1 | 10/2021 | Guynn |
| 2022/0009846 A1 | 1/2022 | Jandhyala et al. |
| 2022/0017419 A1 | 1/2022 | Guynn |
| 2022/0064063 A1 | 3/2022 | Chiang et al. |
| 2022/0106227 A1 | 4/2022 | Guynn et al. |
| 2022/0106235 A1 | 4/2022 | Guynn |
| 2022/0145477 A1 | 5/2022 | Chiang et al. |
| 2023/0036470 A1 | 2/2023 | Finke et al. |
| 2023/0174396 A1 | 6/2023 | Chiang et al. |
| 2023/0271882 A1 | 8/2023 | Sperry, III |
| 2023/0313386 A1 | 10/2023 | Ellis et al. |
| 2023/0330724 A1 | 10/2023 | Chiang |

FOREIGN PATENT DOCUMENTS

| | | | |
|---|---|---|---|
| CN | 214183391 U | 9/2021 | |
| CN | 114954785 A | 8/2022 | |
| EP | 2816140 A1 | 12/2014 | |
| GB | 1008196 A | 10/1965 | |
| JP | 2007177586 | 7/2007 | |
| JP | 2019163623 A | 9/2019 | |
| KR | 2019004791 W | 4/2019 | |
| MX | 2015017701 A1 | 6/2017 | |
| WO | 2008124538 A1 | 10/2008 | |
| WO | 2012142547 A1 | 10/2012 | |
| WO | 2014092667 A1 | 6/2014 | |
| WO | 2014142547 A1 | 6/2014 | |
| WO | 2018078672 A1 | 5/2018 | |
| WO | 2018087697 A1 | 5/2018 | |
| WO | 2019133702 A1 | 7/2019 | |
| WO | 2020150449 A1 | 7/2020 | |
| WO | 2020186178 A1 | 9/2020 | |
| WO | 2021030529 A1 | 2/2021 | |
| WO | WO-2021188154 A1 * | 9/2021 | ........... C04B 14/041 |
| WO | 2021222585 A1 | 11/2021 | |
| WO | 2022020470 A1 | 1/2022 | |
| WO | 2022020572 A1 | 1/2022 | |
| WO | 2022204059 A1 | 9/2022 | |
| WO | 2022216741 A1 | 10/2022 | |
| WO | 2022221334 A1 | 10/2022 | |
| WO | 2023108054 A1 | 6/2023 | |
| WO | 2023150796 A1 | 8/2023 | |
| WO | 2023250495 A1 | 12/2023 | |
| WO | 2024059557 A1 | 3/2024 | |

OTHER PUBLICATIONS

Menendez et al "Durability of Blended Cements Made with Reactive Aggregates", Materials 14, 2948, https://doi.org/10.3390/ma14112948 (Year: 2021).*
The Influence of Moulding Moisture Content on The Engineering Properties of Aggregate-Lime-Natural Pozzolan Mixes, Oct. 2004, Dissertation, University of Pretoria, Pretoria.
K. Robalo et al., "Enhanced Mechanical and Durability Performances of Low Cement Concrete With Natural Pozzolan Addition," Journal of Advanced Concrete Technology, May 2021, 18 pages.
International Patent Application No. PCT/US2022/082301— International Search Report and Written Opinion mailed Apr. 28, 2023, 17 pages.
[No Author Listed], LumiShield Chemistry. LumiShield Technologies, Inc. Pittsburgh, PA Accessed Oct. 15, 2021 as available Jan. 31, 2019 from https://web.archive.org/web/20190131025944/http://lumishieldtech.com/chemistry .html. 1 page.
[No Author Listed], Mineral Commodity Summaries. U.S. Department of the Interior, U.S. Geological Survey. Jan. 2018. 204 pages.
[No Author Listed], Mini Chlor Alkali Plant. SkidPlant. Chenai, India. Accessed Oct. 15, 2021 as available Jan. 10, 2019 from https://web.archive.org/web/20190110233048/http://www.skidplant.com/mini-chlor-alkali-plant 3 pages.
[No Author Listed], Renewable Power Generation Costs in 2017. International Renewable Energy Agency (IRENA), Abu Dhabi. 2018. 160 pages.
Alonso et al., (2001). "Alkaline activation of metakaolin and calcium hydroxide mixtures: influence of temperature, activator concentration and solids ratio," Materials Letters 47: 55-62.
Azo Materials. (2024). Silica-Silicon Dioxide ($SiO_2$) retrieved from the internet on Mar. 6, 2024 from <https://www. azom.com/article.aspx? ArticleID=1114> 5 pages.
Barker et al., $CO_2$ Capture in the Cement Industry. IEA Greenhouse Gas R&D Programme. Cheltenham, Glos., UK. 2008; 1-221.
Belevi et al., Factors Determining the Element Behavior in Municipal Solid Waste Incinerators. 1. Field Studies. Environ. Sci. Technol. May 12, 2000;34(12):2501-2506.
Bioworld. (2016). "Safety Data Sheet, Calcium Chloride Dihydrate," retrieved from the internet on Mar. 6, 2024 from <https:// www.bio-world.com/site/accounts/masterfiles/M S Ds/M S-40300016.pdf> 8 pages.
Bjerge et al., $CO_2$ Capture in the Cement Industry, Norcem $CO_2$ Capture Project (Norway). Energy Procedia. 2014;63:6455-63.
Blunt et al., Carbon Dioxide in Enhanced Oil Recovery. Energy Convers. Mgmt. 1993;34(9-11 ):1197-1204.
Carrasco-Maldonado et al., Oxy-fuel combustion technology for cement production—State of the art research and technology development. International Journal of Greenhouse Gas Control. 2016:45: 189-99. Epub Jan. 4, 2016.
Chen et al., (2009). "Incorporation of waste materials into portland cement clinker synthesized from natural raw materials," J Mater Sci 44: 2617-2627.
Chen et al., Environmental impact of cement production: detall of the different processes and cement plant variability evaluation. Journal of Cleaner Production. 2010;18(5):478-485. Epub Jan. 4, 2010.
Davis et al., Net-zero emissions energy systems. Science. Jun. 29, 2018; 360(6396) 9 pages. Supplementary Material included. 27 pages total.
Delgado et al., $CO_2$ Balance in a Compression and Purification Unit (CPU). Energy Procedia. 2014; 63:322-31.
Dowling et al., Lime in the limelight. Journal of Cleaner Production. 2015;92:13-22. Epub Dec. 20, 2014.
Dubois et al., Study of the post-combustion $CO_2$ capture applied to conventional and partial oxy-fuel cement plants. Energy Procedia. 2017; 114:6181-96.

(56) References Cited

OTHER PUBLICATIONS

Ellis et al. (2020). "Toward Electrochemical Synthesis of Cement-An Electrolyzer-Based Process for Decarbonating :;aCO3 While Producing Useful Gas Streams," PNAS 117(23): 12584-12591.

Encyclopedia Britannica. (2016). "Sedimentary rock," retrieved from the internet on Mar. 7, 2024 from <https://www. britannica.com/science/sedimentary-rock/ Limestones-and-dolomites and wayback https://web.archive.org/ web/20160420201820/https://www_britannica.com/science/ sedimentary-rock/Limestones-and-dolomites> 1 page.

Free, M.L., Hydrometallurgy—Fundamentals and Applications. 2013. John Wiley & Sons, Inc. 451 pages.

Funari et al., Solid residues from Italian municipal solid waste incinerators: A source for ""critical"" raw materials. Waste Manag. Nov. 2015; 45:206-16. Epub Dec. 12, 2014. Pre- publication version provided. 11 pages.

Gardarsdottir et al., Comparison of Technologies for CO2 Capture from Cement Production-Part 2: Cost Analysis. Energies. Feb. 10, 2019;12(3):1-20.

Geels et al., Sociotechnical transitions for deep decarbonization. Science. Sep. 22, 2017;357(6357): 1242-1244.

Gray, H.B., Powering the planet with solar fuel. Nature Chemistry. Mar. 19, 2009;1:7; 2 pages.

Haruta et al., Catalytic Combustion of Hydrogen I-Its Role in Hydrogen Utilization System and Screening of Catalyst Materials. Int. J. Hydrogen Energy. 1981;6(6):601-8.

Hasanbeigi et al., Emerging energy-efficiency and CO2 emission-reduction technologies for cement and concrete production: A technical review. Renewable and Sustainable Energy Reviews. Aug. 30, 2012;16(8):6220-6238.

Ibrahim et al., (2018). "Metakaolin as an Active Pozzolan for Cement That Improves Its Properties and Reduces Its Pollution Hazard," Journal of Minerals and Materials Characterization and Engineering 6: 86-104.

Imbabi et al., Trends and developments in green cement and concrete technology. International Journal of Sustainable Built Environment. 2012;1:194-216. doi: 10.1016/i.iisbe.2013.05.001.

Irabien et al., (1990). "Thermal Dehydration of Calcium Hydroxide. 1. Kinetic Model and Parameters," Ind. Eng. Chem. Res. 29(8): 1599-1606.

Janssen, G.J.M., Modelling study of CO2 poisoning on PEMFC anodes. Journal of Power Sources. Jul. 3, 2004;136:45-54.

Joseph et al., The Use of Municipal Solid Waste Incineration Ash in Various Building Materials: A Belgian Point of View. Materials. Jan. 16, 2018; 11(141): 1-30.

Keith et al., A Process for Capturing CO2 from the Atmosphere. Joule. Aug. 15, 2018;2(8): 1573-94.

Kelly et al., Historical Statistics for Mineral and Material Commodities in the United States, US Geological Survey. Reston, VA Accessed Jan. 7, 2009 as updated Apr. 17, 2008 from http://minerals.usga.gov/ds/2005/140/. 8 pages.

Lassagne et al., Techno-economic study of CO2 capture for aluminum primary production for different electrolytic cell ventilation rates. Chemical Engineering Journal. Jun. 26, 2013;230:338-50.

Lawal et al., Dynamic modelling and analysis of post-combustion CO2 chemical absorption process for coal-fired power plants. Fuel. Jun. 2, 2010;89(10):2791-2801.

Lehne et al., Making Concrete Change; Innovation in Low-carbon Cement and Concrete, Chatham House, London, UK. Jun. 2018. 138 pages.

Li et al., Greenhouse Gas Emissions, Energy Efficiency, and Cost of Synthetic Fuel Production Using Electrochemical CO2 Conversion and the Fischer-Tropsch Process. Energy Fuels. Jun. 1, 2016 ;30(7):5980-9.

Licht et al., STEP Cement: Solar Thermal Electrochemical Production of Cao without CO2 emission. Chem. Commun. 2012;48:6019-6021. doi: 10.1039/c2cc31341c.

Licht, "Co-Production of Cement and Carbon Nanotubes with a Carbon Negative Footprint," Journal of CO2 Utilization, Aug. 2016. Accessed online at on Jan. 14, 2019.

Liu et al., Experimental study on improving cement quality with oxygen enriched combustion technology. IOP Conf. Series: Materials Science and Engineering. 2015;103:1-7.

Madrid et al., Synthesis and morphological examination of high-purity Ca(OH)2 nanoparticles suitable to consolidate porous surfaces. Applied Surface Science. 2017;424:2-8. Epub Mar. 27, 2017.

Marin et al., Simulating the Impact of Oxygen Enrichment in a Cement Rotary Kiln Using Advanced Computational Methods. Combust. Sci. and Tech. 2001;164:193-207.

Mascolo et al., Influence of Polymorphism and Stabilizing Ions on the Strength of Alite. Journal of the American Ceramic Society—Discussion and Notes. Apr. 1973;56(4):222-3.

Mirghiasi et al., (2014), "Preparation and characterization of Cao nanoparticles from Ca(OH)2 by direct thermal decomposition method," Journal of Industrial and Engineering Chemistry 20: 113-117.

Mitlitsky et al. (1998). "Regenerative Fuel Cell Systems," Energy & Fuels 12:56-71.

Morf et al., Precious metals and rare earth elements in municipal solid waste—sources and fate in a Swiss incineration plant. Waste Manag. Mar. 2013;33(3):634-44. Epub Oct. 22, 2012. Erratum in: Waste Manag. Jun. 2013;33 (6):1573.

Mujumdar et al., Rotary Cement Kiln Simulator (RoCKS): Integrated modeling of pre-heater, calciner, kiln and clinker cooler. Chemical Engineering Science. 2007;62(9):2590-607. Epub Feb. 14, 2007.

Odler et al., Polymorphism and Hydration of Silicate Silicate Doped With ZnO. Journal of the American Ceramic Society. Jan. 1983;66(1):1-4.

Rau (2009). "Electrochemical CO2 capture and storage with hydrogen generation," Energy Procedia 1: 823-828.

Rau, "Electrochemical Splitting of Calcium Carbonate to Increase Solution Alkalinity: Implications for Mitigation of Carbon Dioxide and Ocean Acidity," Environ. Sci. Technol.; vol. 42; 2008; pp. 8935-8940.

Rau, CO2 Mitigation via Capture and Chemical Conversion in Seawater. Environ. Sci. Technol. 2011 ;45(3): 1088-1092.

Schmidt et al., Future cost and performance of water electrolysis: An expert elicitation study. International Journal of Hydrogen Energy. Nov. 22, 2017;42(52):30470-92.

Stevula et al., Hydration of Polymorphic Modification C3S. Cement and Concrete Research. 1981 ;11(2): 183-190.

Sutkovic. (2014). "Ionic Chemical Equations," retrieved from the internet on Mar. 6, 2024 from <https://www.lus.edu.ba/ common/2014SpringChemistryProblemSample1.pdf> 3 pages.

Syc et al., Metal recovery from incineration bottom ash: State-of-the-art and recent developments. J Hazard Mater. Jul. 5, 2020;393:1-17. Epub Feb. 2, 20209.

Taylor, Cement chemistry, 2nd edition. 1997. Thomas Telford Publishing. London, UK. 470 pages.

Topham et al., Carbon Dioxide. Ullmann's Encyclopedia of Industrial Chemistry. Wiley-VCH. May 2014:1-43.

Traynor et al., Dissolution of olivines from steel and copper slags in basic solution. Cement and Concrete Research. Jul. 2020;133: 106065. Author manuscript provided. 33 pages.

Voldsund et al., Comparison of Technologies for CO2 Capture from Cement Production—Part 1: Technical Evaluation. Energies. Feb. 12, 2019;12:559. 33 pages.

Yao et al., Mobility of heavy metals and rare earth elements in incineration bottom ash through particle size reduction. Chemical Engineering Science. Oct. 18, 2014;18:214-220.

Zeman et al., The Reduced Emission Oxygen Kiln: A White Paper Report for the Cement Sustainability Initiative of the World Business Council on Sustainable Development. Lenfest Center for Sustainable Energy. Columbia University. New York, NY. Jul. 31, 2008. 77 pages.

Zeman, Oxygen combustion in cement production. Energy Procedia. 2009;1:187-94.

International Search Report and Written Opinion for International App. No. PCT/US2023/085160; Date of Filing: Dec. 20, 2023; Applicant: Graymont Western Canada Inc.; Date of Mailing: May 1, 2024, 11 pages.

Geology. Limestone [retrieved from the internet at May 2, 2024 from URL: https//geology.com/rocks/limestone.shtml> and wayback

(56) References Cited

OTHER PUBLICATIONS machine at ,URL:httpps://web.archive.org/web/20211015232211/https://geology.com/rocks/limestone.shtml>] (Year:2021).
CN 108117356-A, machine translation (Year: 2018).

* cited by examiner

LIME-BASED CEMENT EXTENDER COMPOSITIONS, AND ASSOCIATED SYSTEMS AND METHODS

CROSS-REFERENCE TO RELATED APPLICATIONS

The present application is a continuation of U.S. Non-Provisional patent application Ser. No. 18/087,728, filed Dec. 22, 2022, which claims the benefit of priority to U.S. Provisional Patent Application No. 63/293,513, filed Dec. 23, 2021, and is related to U.S. patent application Ser. No. 17/560,884 (now U.S. Pat. No. 11,725,148), filed Dec. 23, 2021, titled CALCINED CLAY TAILINGS AND/OR CALCINED MINE WASTE, AND ASSOCIATED SYSTEMS AND METHODS, the disclosures of which are each incorporated herein by reference in their entireties.

TECHNICAL FIELD

This present disclosure relates to lime-based cement extender compositions, and associated systems and methods. Particular embodiments of the present disclosure relate to combining lime-based cement extender composition and cement to produce products for use in the mining industry.

BACKGROUND

Conventional mine backfill solutions generally include a combination of cement and fly ash, which is used as a cement extender or supplementary cementitious material. However, using fly ash for mine backfill has certain disadvantages, including that significant amounts of fly ash are needed and that the unconfined compressive strength (UCS) of fly ash varies, e.g., depending on the quality of the fly ash. Additionally, the availability of fly ash is diminishing over time, in part because fly ash is produced as a by-product at coal facilities which are being decommissioned or turned down due to issues associated with the environment and greenhouse gas emissions. The diminishing supply of fly ash has caused its cost (e.g., relative to the cost of cement) to increase, making the economics for producing mine backfill with fly ash unpredictable and less desirable. As such, a need exists to develop alternatives to fly ash and/or improved mine backfill solutions.

BRIEF DESCRIPTION OF THE DRAWINGS

Features, aspects, and advantages of the presently disclosed technology may be better understood with regard to the following drawings.

Figure 1:
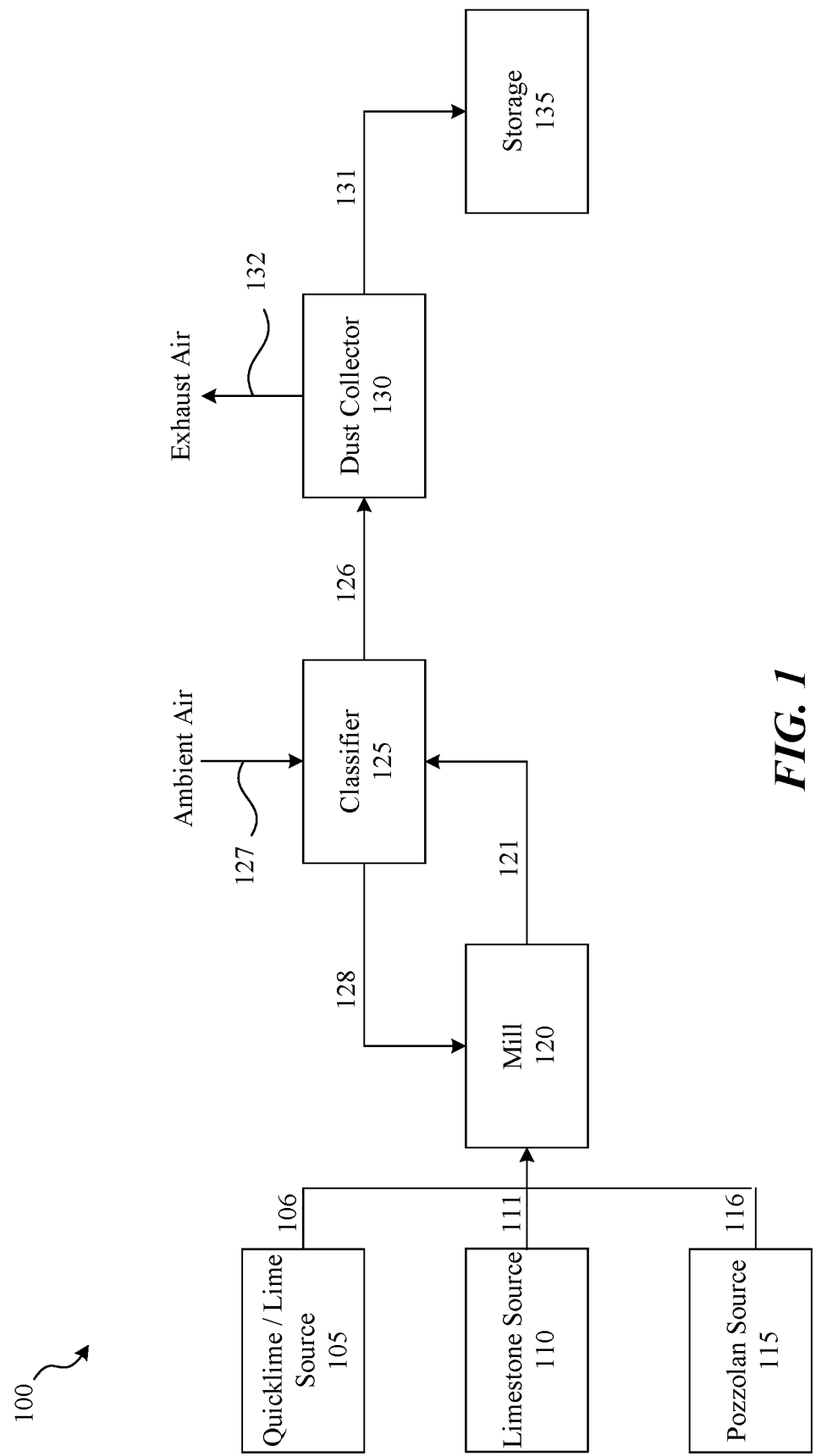
FIG. 1 is a schematic block diagram of a system for manufacturing lime-based cement extender compositions, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present disclosure relate to combining lime, limestone, and pozzolans to produce a solution that can be combined with cement for use in the mining industry, e.g., as mine backfill. As noted above, mine backfill solutions can generally include a combination of cement and fly ash, which is used as a cement extender or supplementary cementitious material. However, because the availability of fly ash is diminishing over time, significant amounts of fly ash are needed, and the unconfined compressive strength (UCS) of fly ash varies depending on the quality of the fly ash, using fly ash can cause difficulties.

Embodiments of the present disclosure address at least some of the above-described issues associated with using fly ash in combination with cement, e.g., for mine backfill applications, by producing a lime-based cement extender composition (also referred to as supplementary cementitious material or composition) that can effectively act as a substitute or alternative for fly ash when combined with cement. For example, as described elsewhere herein, embodiments of the present disclosure can comprise a lime-based cement extender composition including 5-20% by weight lime particles, 20-50% by weight limestone particles, and 35-70% by weight pozzolan particles. Additionally or alternatively, the lime-based cement extender composition can comprise a calcium oxide concentration of 25-65%, a magnesium oxide concentration of 0.5-2%, an iron oxide concentration of 0.5-2.0%, an aluminum oxide concentration of 2-8%, a silicon dioxide concentration of 20-50%, a potassium oxide concentration of 20,000-45,000 ppm, and a sodium oxide concentration of 10,000-30,000 ppm. Such concentrations can be determined based on an elemental analysis, e.g., in which an element of this composition is vaporized (e.g., via inductively coupled plasma (ICP)) and then analyzed by spectrometry (e.g., atomic emission spectroscopy (AES) or mass spectrometry). For example, the percent calcium oxide may be determined based on the elemental amount of calcium, the percent magnesium oxide may be determined based on the elemental amount of magnesium, and the percent iron oxide may be determined based on the elemental amount of iron. In some embodiments, the lime-based cement extender composition, or product, can be combined with cement to produce a cement blend for use in the mining industry as mine backfill.

Embodiments of the present disclosure enable the production of improved compositions, e.g., for mine backfill applications, that do not include or rely on fly ash. As such, embodiments of the present technology may not be affected by the diminishing supply and increased price of fly ash. Additionally, embodiments of the present technology, when combined with cement, can form an improved product (e.g., mine backfill product) that uses relatively less material, has less variability in composition, last longer, and has a higher unconfined compressive strength relative to products that use fly ash. Additionally, the greenhouse gas and carbon footprint associated with producing embodiments of the present technology can be less than that of using cement alone or producing fly ash, which is produced as a by-product of coal facilities.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Lime-Based Cement Extender Compositions, and Associated Systems and Methods

FIG. 1 is a schematic block diagram of a system 100 for manufacturing lime-based cement extender compositions, in accordance with embodiments of the present technology. The system 100 can include a quicklime and/or lime source 105 ("lime source 105"), a limestone source 110, and a pozzolan source 115. The lime source 105 can comprise quicklime (i.e., calcium oxide), dolomitic quicklime, lime (i.e., calcium hydroxide), hydrated lime, and/or enhanced lime (e.g., lime having a specific surface area greater than 35 m$^2$/g), and can have a particle size less than 0.375 inches. The quicklime can have a calcium content of at least 80%, 85%, 86%, 87%, 88%, 89%, 90%, 91%, 92%, 93%, 94%, or 95% by weight. The lime source 105 can provide available calcium and/or calcium hydroxide at a high pH (e.g., above 11.5 or 12.0) to the downstream mixture, that in part enables pozzolanic reactions to occur and strength gain for the downstream mixture and/or end product. In some embodiments, the limestone source 110 and/or the pozzolan source 115 can each contain up to 8% water.

The limestone source 110 can comprise pulverized limestone (i.e., calcium carbonate), precipitated calcium carbonate (PCC), argillaceous limestone, and/or dolomite limestone, and can have a particle size less than 0.375 inch. The limestone can have a calcium content of at least 80%, 85%, 86%, 87%, 88%, 89%, 90%, 91%, 92%, 93%, 94%, or 95% by weight. The limestone source 110 can enable the downstream mixture to have increased strength and, without being bound by theory, can provide nucleation sites for cementation reactions and provide fine filler materials that increase strengths by optimizing the particle size distribution of the backfill mixtures.

The pozzolan source 115 can comprise a natural pozzolan, volcanic ash, zeolite, calcined clay, silicate, aluminate, silica flume, bauxite residue, or pozzolan slag. In some embodiments, the pozzolan source 115 can comprise (i) at least 5%, 6%, 7%, 8%, 9%, or 10% by weight aluminum oxide, (ii) at least 50%, 55%, 60%, 61%, 62%, 63%, 64%, or 65% by weight silicon dioxide, (iii) at least 50,000 ppm, 52,000 ppm, 54,000 ppm, or 56,000 ppm potassium dioxide, and (iv) at least 30,000 ppm, 32,000 ppm, 34,000 ppm, or 36,000 ppm sodium dioxide, e.g., as determined by elemental analysis from ICP methods. The pozzolan source 115 acts as the silicate and aluminate source for the downstream mixture and/or end product, and in part enables the downstream mixture and/or end product to build strength via pozzolanic reactions.

The system 100 can include a plurality of weighing devices configured to weigh each of the lime source 105, limestone source 110, and pozzolan source 115 ("feed components"), and a plurality of respective conveyer belts 106, 111, 116 configured to convey the feed components to a milling and/or blending unit 120 ("mill 120"). The mill 120 can be a ball mill (e.g., a horizontal ball mill) configured to mechanically grind and blend the feed components to produce a milled blend 121. Mechanically grinding the feed components via the mill 120 can cause the feed components to be simultaneously hydrated and dried. For example, the residual moisture of the feed components (e.g., the limestone and/or pozzolan) can chemically convert the quicklime to calcium hydroxide via Reaction 1.

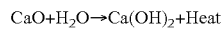

$$CaO + H_2O \rightarrow Ca(OH)_2 + Heat \qquad \text{(Reaction 1)}$$

The heat produced via Reaction 1, and in some embodiments the heat of friction from the mechanical grinding action of the ball mill, reduces the residual moisture of the feed components. For example, the moisture content of the milled blend exiting the mill 120 can be less than 8%, 7%, 6%, 5%, 4%, 3%, or 2% by weight. As such, the system 100 is able to reduce the moisture content of the feed components with just the mill 120, and without additional equipment (e.g., a rotary dryer, burners, etc.) that increase capital and operating costs and generate combustion and other greenhouse gases that complicate environmental permitting. Doing so improves the economics of producing lime-based cement extender compositions, e.g., relative to fly ash.

The milled blend can comprise (i) at least 10%, 15%, 20%, 25%, 30%, or 10-30% by weight quicklime, (ii) 20%, 25%, 30%, 35%, 40%, 45%, 50%, or 25-50% by weight limestone, and (ii) 35%, 40%, 45%, 50%, 60%, 65%, 70% or 35-70% by weight pozzolans. Additionally or alternatively, the milled blend can comprise (i) a calcium oxide concentration of 25-65%, (ii) a magnesium oxide concentration of 0.5-2%, (iii) an iron oxide concentration of 0.5-2.0%, (iv) an aluminum oxide concentration of 2-8%, (v) a silicon dioxide concentration of 20-50%, (vi) a potassium oxide concentration of 20,000-45,000 ppm, and (vii) a sodium oxide concentration of 10,000-25,000 ppm, e.g., as determined by elemental analysis from ICP methods. The amount calcium oxide or calcium hydroxide of the milled blend that is available to react as part of the pozzolan reactions can be at least 10% by weight, no more than 30% by weight, or 10-30% by weight. The amount of available calcium oxide or calcium hydroxide was determined based on ASTM C 25-19: "Standard Test Methods for Chemical Analysis of limestone, quicklime, and hydrated lime."

The system 100 can further comprise an air separation and classification unit 125 ("classifier 125") configured to receive an ambient air stream 127 and produce a product 126 (e.g., a mine backfill product). The classifier 125 can comprise an inlet 121, an outlet 126, and a return line 128 extending from the classifier 120 to the mill 120. The inlet 121 of the classifier 125 can comprise or be coupled to one or more screw conveyors and bucket elevators configured to transfer the milled blend from the mill 120 to the classifier 125. The classifier 125 can include a mechanical air swept separator sized such that at least 90%, 95%, or 99% of the particles are configured to pass 200 mesh and/or have a particle size no more than 75 microns. Such a particle size, relative to large particles, increases the surface area to volume ratio and enables the product to react quickly (or relatively quicker). Additionally, by reducing the particle size to pass 200 mesh and/or be no more than 75 microns, the particle size distribution is more uniform, thereby inhibiting the likelihood of segregation during transport, and the particle size is more similar to that of cement, thereby enabling better mixing and inhibiting segregation. Particles that do not pass through the separator will impact a rotating mechanical member of the separator and be returned to the mill 120, e.g., via the return line 128 (e.g., a chute) or other means, for further milling and size reduction. After further milling, these particles can be re-directed to the classifier 125 via the one or more screw conveyors and bucket elevators and/or inlet 121.

The system 100 can further comprise a dust collector 130 (e.g., a baghouse) downstream of the classifier 125, and storage 135 downstream of the dust collector 130. The particles that have a suitable particle size and pass through the separator of the classifier 125 are directed to the dust collector 130. The dust collector 130 emits an exhaust air stream 132 and is configured to remove dust and other fines prior to the product being directed, e.g., via conveyors and/or elevators 131 to the storage 135 (e.g., product silos) for distribution to customers.

The product (e.g., mine backfill product) sent to the storage 135 can comprise particles for which at least 90%, 95%, or 99% passes 200 mesh and/or has a particle size no more than 75 microns. Additionally, the product can have a composition similar or identical to that of the mill 120. For example, the product can comprise (i) at least 10%, 15%, 20%, 25%, 30%, or 10-30% by weight quicklime, (ii) 20%, 25%, 30%, 35%, 40%, 45%, 50%, or 25-50% by weight limestone, and (ii) 35%, 40%, 45%, 50%, 60%, 65%, 70% or 35-70% by weight pozzolans. Additionally or alternatively, the product can comprise (i) a calcium oxide concentration of 45-65%, (ii) a magnesium oxide concentration of 0.5-2%, (iii) an iron oxide concentration of 0.5-2.0%, (iv) an aluminum oxide concentration of 2-8%, (v) a silicon dioxide concentration of 20-40%, (vi) a potassium oxide concentration of 20,000-30,000 ppm, and (vii) a sodium oxide concentration of 10,000-20,000 ppm, e.g., as determined by elemental analysis from inductively-coupled plasma methods.

The product (e.g., the lime-based cement extender composition) can have an unconfined compressive strength (UCS) equal to or greater than 0.70 Megapascals (MPa) (e.g., at least 28 days after formation), and that increases over time. A relatively high UCS is a desirable characteristic for products used in the mining industry, e.g., as mine backfill. As shown in Table 1 below, which uses a 7% by weight total binder concentration of Portland cement and the lime-based cement extender for a model paste backfill system, the UCS measured at day 28 for each of the samples shown that includes limestone is greater than 0.70 MPa, and the greatest UCS obtained is for products comprising at least 21.25% limestone and 21.25% natural pozzolan.

TABLE 1

| Total Binder Composition | | | | 20 Hour UCS MPa | | 28 Day UCS MPa | |
|---|---|---|---|---|---|---|---|
| Portland Cement | Quicklime | Limestone | Natural Pozzolan | | | | |
| 100.00% | 0.00% | 0.00% | 0.00% | 0.20 | ±0.02 | 0.90 | ±0.01 |
| 50.00% | 50.00% | 0.00% | 0.00% | 0.12 | ±0.02 | 0.62 | ±0.07 |
| 50.00% | 10.00% | 20.00% | 20.00% | 0.10 | ±0.01 | 0.70 | ±0.10 |
| 75.00% | 10.00% | 20.00% | 20.00% | 0.10 | ±0.02 | 0.73 | ±0.02 |
| 50.00% | 7.50% | 21.25% | 21.25% | 0.10 | ±0.02 | 0.88 | ±0.05 |
| 50.00% | 5.00% | 22.50% | 22.50% | 0.17 | ±0.02 | 0.94 | ±0.02 |

In some embodiments, the product can be combined with cement to produce a cement blend for use in the mining industry, e.g., as mine backfill. In such embodiments the product can comprise 20%, 25%, 30%, 35%, 40%, 45%, 50%, or 55% of the blend, with cement comprising the balance. As shown in Table 2 below, the cement blend can have a UCS that increases over time (e.g., from Days 7 to 28) in a model sand system with 20% binder content. For example, the unconfined compressive strength of the product 7 days of being formed is at least 8 MPa, 9 MPa, 10 MPa, 11 MPa, 12 MPa, or 13 MPa, and the unconfined compressive strength of the product 28 days of being formed is at least 11 MPa, 12 MPa, 13 MPa, 14 MPa, 15 MPa, 16 MPa, or 17 MPa. The UCS measurements shown in Table 2 were determined based in part on ASTM C109 "Standard Test Method for Compressive Strength of Hydraulic Cement Mortars" using 2-inch (or 50 mm) cube specimens. Additionally, the total binder concentration by weight of Portland cement and the lime-based cement extender is 20%.

As also shown in Table 2, the cement blend can over time have a higher UCS relative to cement alone. That is, for nearly every "Binder Composition" (e.g., the lime-based cement extender composition) of Table 2 comprising 50% by weight each of Portland Cement and the product (i.e., a combination of quicklime, limestone, and pozzolan), the UCS of the Binder Composition at Day 28 was higher than that of Portland Cement on its own.

TABLE 2

| Binder Composition | | | | Unconfined Compressive Strength | | | | Relative performance indexed to Portland Cement Only | |
|---|---|---|---|---|---|---|---|---|---|
| | | | | Day 7 | | Day 28 | | | |
| Portland Cement | Quicklime | Limestone | Pozzolan | MPa | St. dev | MPa | St. dev | Day 7 | Day 28 |
| 50% | 0.0% | 25.0% | 25.0% | 10.3 | 1.8 | 12.8 | 3.0 | 0.78 | 1.01 |
| 50% | 16.7% | 16.7% | 16.7% | 9.8 | 0.3 | 13.6 | 0.7 | 0.74 | 1.07 |
| 50% | 10.0% | 20.0% | 20.0% | 10.8 | 0.5 | 14.7 | 1.4 | 0.81 | 1.16 |

TABLE 2-continued

| Binder Composition | | | | Unconfined Compressive Strength | | | | Relative performance indexed to Portland Cement Only | |
|---|---|---|---|---|---|---|---|---|---|
| Portland Cement | Quicklime | Limestone | Pozzolan | Day 7 MPa | St. dev | Day 28 MPa | St. dev | Day 7 | Day 28 |
| 50% | 5.0% | 25.0% | 20.0% | 8.6 | 1.0 | 14.6 | 2.2 | 0.65 | 1.15 |
| 50% | 5.0% | 20.0% | 25.0% | 9.1 | 1.5 | 17.1 | 2.2 | 0.68 | 1.35 |
| 50% | 5.0% | 22.5% | 22.5% | 10.8 | 0.5 | 11.8 | 1.1 | 0.82 | 0.93 |
| 50% | 7.5% | 21.3% | 21.3% | 10.7 | 0.6 | 15.2 | 1.2 | 0.80 | 1.20 |
| 50% | 12.5% | 18.8% | 18.8% | 10.5 | 0.3 | 16.7 | 1.0 | 0.79 | 1.31 |
| 50% | 10.0% | 20.0% | 20.0% | 9.8 | 1.7 | 15.7 | 1.9 | 0.74 | 1.24 |
| 50% | 5.0% | 22.5% | 22.5% | 8.7 | 0.4 | 15.5 | 0.7 | 0.65 | 1.22 |
| 50% | 7.5% | 21.3% | 21.3% | 10.3 | 0.4 | 15.0 | 1.7 | 0.77 | 1.18 |
| 50% | 7.5% | 22.5% | 20.0% | 8.5 | 0.8 | 13.7 | 1.3 | 0.64 | 1.08 |
| 50% | 7.5% | 20.0% | 22.5% | 11.3 | 0.3 | 17.7 | 2.4 | 0.85 | 1.40 |
| 100% | 0.0% | 0.0% | 0.0% | 13.3 | 2.2 | 12.7 | 1.9 | 1.00 | 1.00 |
| 50% | 0.0% | 0.0% | 50.0% | 10.8 | 2.0 | 14.0 | 1.2 | 0.81 | 1.10 |
| 50% | 0.0% | 50.0% | 0.0% | 7.2 | 0.1 | 8.1 | 0.9 | 0.54 | 0.64 |
| 50% | 50.0% | 0.0% | 0.0% | 4.2 | 0.6 | 3.8 | 0.2 | 0.32 | 0.30 |

As shown in Table 2, multiple Binder Compositions including Portland Cement and the product had a higher UCS than Portland Cement combined with just one of (i) quicklime, (ii) limestone, or (iii) pozzolan. That is, the improvement in UCS of the blends of the present technology disclosed herein are due in part to a combined effect of each of quicklime, limestone, and pozzolan. For example, without being bound by theory, (i) the quicklime can provide calcium and/or calcium hydroxide particles and an alkali environment for silicate and aluminate found in the pozzolan to complete cement reactions that form calcium silicate hydrates and/or aluminum silicate hydrates that increase strength of the blend, (ii) the limestone can provide nucleation sites to catalyze such cement reactions, thereby enabling the reactions to initiate faster and/or better, and (iii) the pozzolan acts as a source of silicate and aluminate, and react with the quicklime and/or calcium to enable strength-building pozzolanic reactions. Additionally or alternatively, the improvement in UCS for embodiments of the present technology may be due to the fines filler effect, which suggests that a specific particle size (e.g., fine limestone particles) or particle size distribution of the composition optimizes strength achieved when combined to make the mine backfill product. As disclosed herein, omitting one of the quicklime, limestone or pozzolan will result in a composition with a lower UCS over time. Each composition including cement, quicklime, limestone, and pozzolan will provide some amount of strength, but there will be some ideal blend that optimizes these beneficiation mechanisms, e.g., from the limestone fines versus adding more reactants for the cement reactions.

Figure 2:
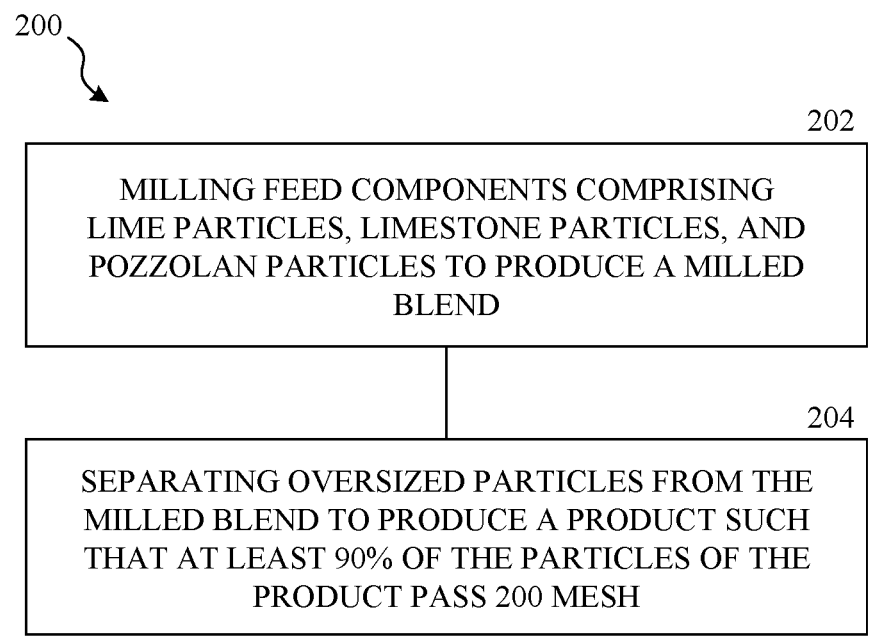
FIG. 2 is a flow diagram of a method for producing lime-based cement extender compositions, in accordance with embodiments of the present technology.

FIG. 2 is a flow diagram of a method 200 for producing lime-based cement extender compositions, in accordance with embodiments of the present technology. The method 200 includes milling feed components comprising lime particles (e.g., the lime source 105; FIG. 1), limestone particles (e.g., the limestone source 105; FIG. 1), and pozzolan particles (e.g., the pozzolan source 105; FIG. 1) (process portion 202) to produce a milled product. Each of the lime particles, limestone particles, and pozzolan particles can originate from respective lime, limestone, and pozzolan sources, and be weighed and conveyed via conveyor belts for milling. Milling the feed components can be done in a horizontal ball mill and can produce a milled product comprising (i) at least 10% by weight of the lime particles, (ii) 20%, 25%, 30%, 35%, 40%, 45%, 50%, or 25-50% by weight limestone particles, and (ii) 35%, 40%, 45%, 50%, 60%, 65%, 70% or 35-70% by weight pozzolan particles. Additionally or alternatively, the milled blend can comprise a calcium oxide concentration of 45-65%, a magnesium oxide concentration of 0.5-2%, an iron oxide concentration of 0.5-2.0%, an aluminum oxide concentration of 2-8%, a silicon dioxide concentration of 20-40%, a potassium oxide concentration of 20,000-30,000 ppm, and a sodium oxide concentration of 10,000-20,000 ppm, e.g., as determined by elemental analysis from inductively-coupled plasma methods. Milling (e.g., grinding) the feed components can also simultaneously blend the individual feed components to form a uniform blend, as well as dry the feed components to reduce their residual moisture content. Without being bound by theory, the heat for drying the feed components may originate from the heat of friction from the mechanical grinding action of the ball mill. Additionally or alternatively, the moisture content can also be reduced via the interaction of quicklime of the lime particles and residual moisture present within the ball mill, which react with one another (via Reaction 1) to form calcium hydroxide and heat.

The method 200 further includes separating oversized particles from the milled blend to produce a product (e.g., the product or lime-based cement extender composition referred to elsewhere herein), such that at least 90%, 95%, 97%, or 99% of the particles of the product pass 200 mesh (process portion 204). Stated differently, at least 90% of the particles of the product have a particle size no greater than 75 microns. Separation of the oversized particles can occur via an air classifier (e.g., the classifier 125), in which oversized particles are directed back to the mill (e.g., via a chute or return line) for further grinding and size reduction, and the remaining particles are directed to an outlet of the classifier. Structures other than air classifiers, such as screen decks, can also be used to separate oversized particles. The oversized particles directed back to the mill are eventually returned to the classifier (e.g., via a plurality of conveyors and bucket loaders). The remaining particles (e.g., the particles passing 200 mesh) can be directed to a dust collector, and subsequently to storage (e.g., product silos) as product for distribution to customers.

In some embodiments, the product can be combined with cement, e.g., to be used in the mining industry as mine backfill. Doing so can effectively extend the use of cement, by maintaining or enhancing its utility while improving the economics associated with its use. The product can comprise 40%, 45%, 50%, or 55% of the blend, with cement comprising the balance. The cement blend can have a UCS that increases over time, e.g., from Days 7 to 28 after formulation. For example, the UCS of the product 7 days of being formed is at least 8 MPa, 9 MPa, 10 MPa, 11 MPa, 12 MPa, or 13 MPa, and the unconfined compressive strength of the product 28 days of being formed is at least 11 MPa, 12 MPa, 13 MPa, 14 MPa, 15 MPa, 16 MPa, or 17 MPa. Additionally or alternatively, the cement blend can over time have a higher UCS relative to cement alone. For example, the UCS of a cement blend comprising about 50% by weight of each of Portland Cement and product (i.e., quicklime, limestone, and pozzolan), at Day 28, can be higher than that of Portland Cement on its own. Additionally, the UCS of a cement blend comprising about 50% by weight of each of Portland Cement and product (i.e., quicklime, limestone, and pozzolan), at Day 28, can be higher than the UCS of Portland Cement and one of (i) quicklime, (ii) limestone, or (iii) pozzolan.

Embodiments of the present disclosure enable the production of products (e.g., mine backfill) by producing a lime-based cement extender composition that can effectively act as a substitute or alternative for fly ash when combined with cement. As such, embodiments of the present disclosure enable the production of improved compositions for mine backfill applications that do not include or rely on fly ash, and, additionally, are not affected by the diminishing supply and increased price of fly ash. Additionally, the lime-based cement extender compositions of the present technology can form an improved product that uses relatively less material, last longer, and has a higher unconfined compressive strength, relative to mine backfill products that include fly ash. Additionally, producing embodiments of the present technology can result in fewer greenhouse gas emissions and a smaller carbon footprint relative to that of fly ash, which is produced as a by-product of coal facilities.

IV. EXPERIMENTAL RESULTS

Figure 3A:
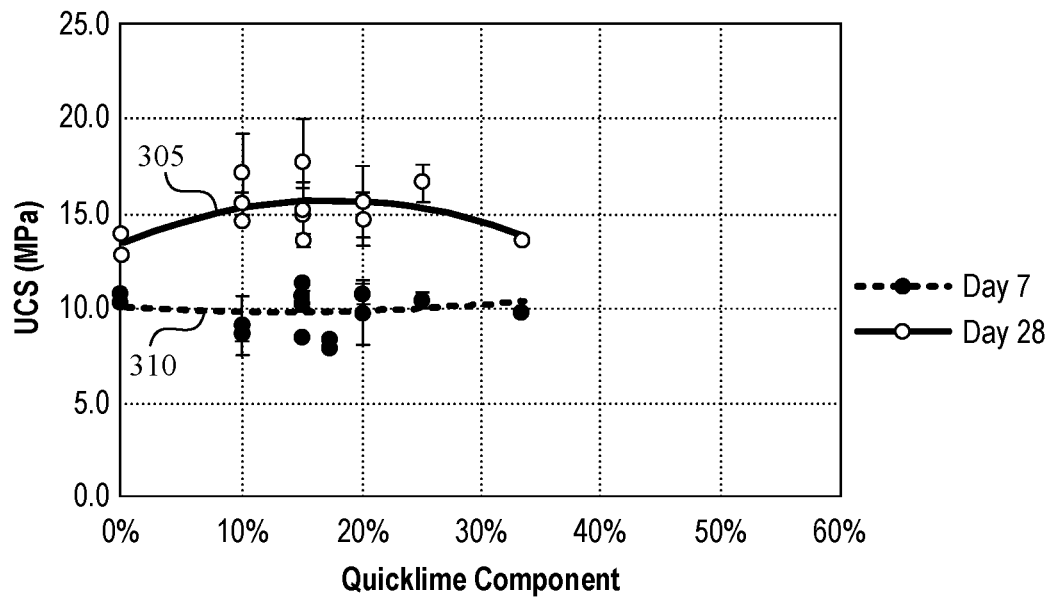
FIG. 3A illustrates the relationship between UCS and varying amounts of quicklime, in accordance with embodiments of the present technology.
Figure 3B:
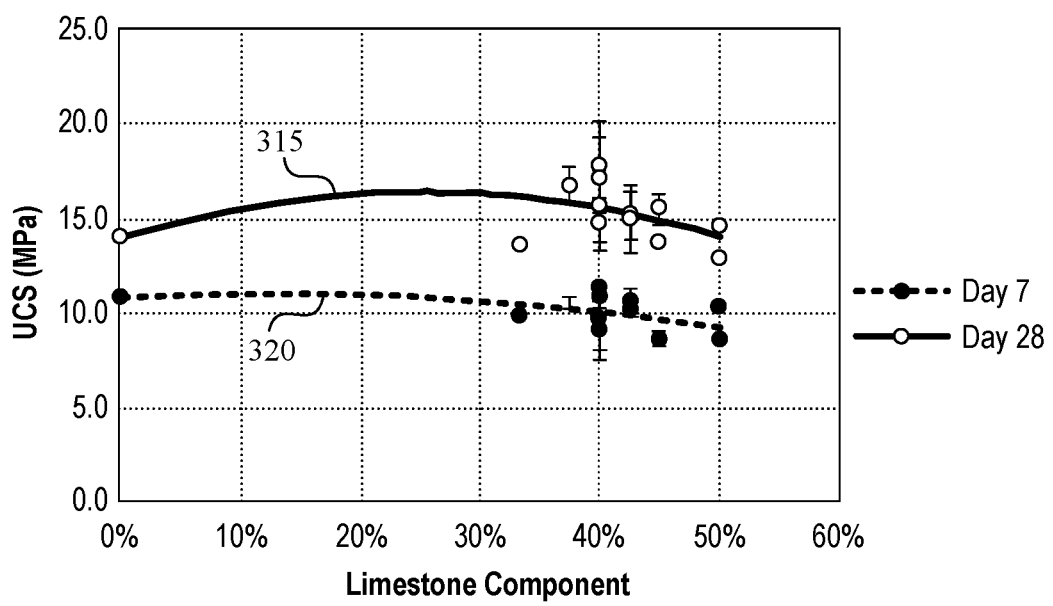
FIG. 3B illustrates the relationship between UCS and varying amounts of limestone, in accordance with embodiments of the present technology.
Figure 3C:
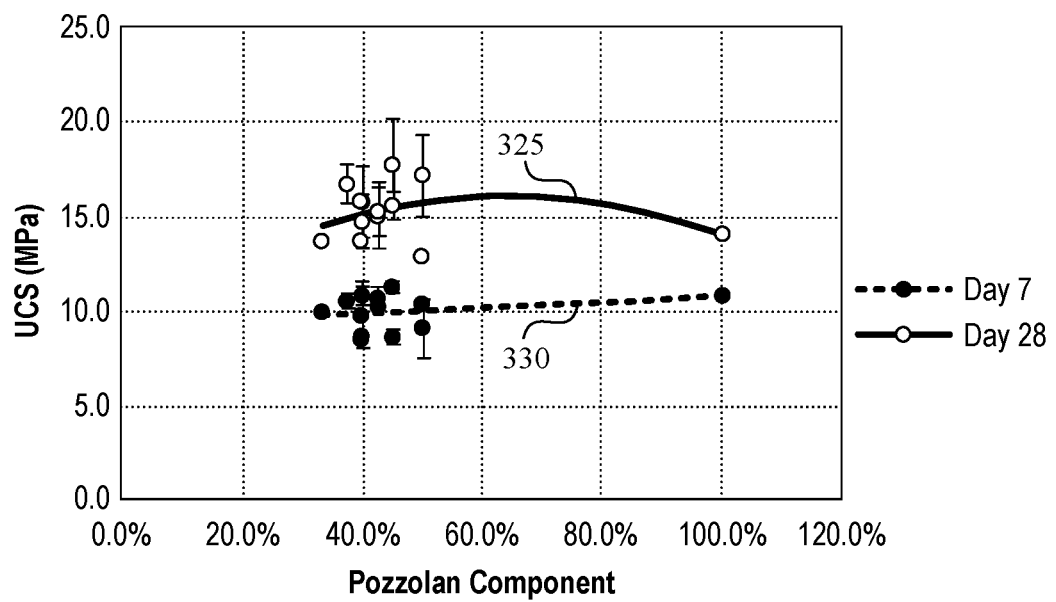
FIG. 3C illustrates the relationship between UCS and varying amounts of pozzolan, in accordance with embodiments of the present technology.

FIGS. 3A-3C are plots illustrating the relationship between UCS (MPa) and varying amounts of individual components of a composition, in accordance with embodiments of the present technology. FIG. 3A illustrates the relationship between UCS and varying amounts of quicklime, FIG. 3B illustrates the relationship between UCS and varying amounts of limestone, and FIG. 3C illustrates the relationship between UCS and varying amounts of pozzolan. The composition used for each of the plots of FIGS. 3A-3C includes 50% cement, and varying amounts of the individual components as shown in FIGS. 3A-3C. As such, the percentages shown for each of the individual components in FIGS. 3A-3C represents 50% of the composition. Moreover, for each of the plots, which shows varying amounts of one of the quicklime, limestone, or pozzolan, the amount of the other components also varies. For example, for the plot of FIG. 3A which shows the amount of quicklime varying from 0% to about 34%, the amount of limestone and/or pozzolan also varies as the amount of quicklime increases. With reference to FIGS. 3A-3C together, the UCS exhibits a peak at various amounts for each of the individual components. For example, the UCS peak for quicklime occurs at about 17% (FIG. 3A), the UCS peak for limestone occurs at about 25% (FIG. 3B), and the UCS peak for pozzolan occurs at about 65% (FIG. 3C). As such, in some embodiments an optimal strength for the overall composition can occur when the composition comprises about 45-55% cement, about 6-10% quicklime, about 10-15% limestone, and about 30-35% pozzolan.

Table 3 includes data corresponding to the amount of available CaO and pH for a type I/II cement ("Cement"), a lime-based cement extender product ("Product"), and a 1:1 mixture of the Cement and Product. The Product here can correspond to the product or lime-based cement extender composition described above with reference to FIGS. 1 and/or 2.

TABLE 3

| Material | % Available CaO | pH |
| --- | --- | --- |
| Type I/II Cement ("Cement") | 15.7 | 12.1 |
| Lime Based Cement Extender ("Product") | 10.3 | 12.5 |
| 1:1 mixture of Cement and Product | 16.4 | 12.5 |

The percent available CaO shown in Table 3 was determined based on ASTM C 25-19: "Standard Test Methods for Chemical Analysis of Limestone, Quicklime, and Hydrated Lime". The pH was obtained by creating an about 5% slurry of the material in distilled water, and measuring the pH once the temperature stabilized at room temperature (about 22° C.) using a calibrated pH electrode.

As shown in Table 3, the lime supplies at least 10% available lime in the Product, which results in no reduction of available CaO in the blended mixtures. That is, the available lime of the Cement is about 15.7% and the available lime of the 1:1 mixture is about 16.4. Additionally, the lime maintains the pH above about 12.0, thereby enabling pozzolanic reactions to occur and/or continue, which develops UCS gains over time.

V. CONCLUSION

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, strength, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10. As such, a range of "1-10" includes, for example, the values 2, 5.5, and 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A lime-based cement extender composition, comprising:
   lime particles comprising calcium hydroxide and/or calcium oxide and at least 10% by weight of the composition;
   limestone particles comprising calcium carbonate and at least 20% by weight of the composition; and
   pozzolan particles comprising silicon dioxide and/or aluminum dioxide and at least 30% by weight of the composition,
   wherein at least 90% of the lime particles, limestone particles, and pozzolan particles are less than 75 microns.

2. The composition of any one of the clauses herein, wherein the lime particles comprise 10-20% by weight of the composition.

3. The composition of any one of the clauses herein, wherein the limestone particles comprise 40-50% by weight of the composition.

4. The composition of any one of the clauses herein, wherein the pozzolan particles comprise 40-50% by weight of the composition.

5. The composition of any one of the clauses herein, wherein:
   the lime particles comprise about 10% by weight of the composition,
   the limestone particles comprise about 45% by weight of the composition, and
   the pozzolan particles comprise about 45% by weight of the composition.

6. The composition of any one of the clauses herein, further comprising:
   a calcium oxide concentration of 45-65%;
   a magnesium oxide concentration of 0.5-2%;
   an iron oxide concentration of 0.5-2.0%
   an aluminum oxide concentration of 2-8%;
   a silicon dioxide concentration of 20-40%;
   a potassium oxide concentration of 20,000-30,000 ppm; and
   a sodium oxide concentration of 10,000-20,000 ppm.

7. The composition of any one of the clauses herein, further comprising a calcium oxide concentration of 45-65%.

8. The composition of any one of the clauses herein, further comprising a magnesium oxide concentration of 0.5-2%.

9. The composition of any one of the clauses herein, further comprising an iron oxide concentration of 0.5-2.0%.

10. The composition of any one of the clauses herein, further comprising an aluminum oxide concentration of 2-8%.

11. The composition of any one of the clauses herein, further comprising a silicon dioxide concentration of 20-40%.

12. The composition of any one of the clauses herein, wherein the lime particles comprise a calcium concentration of at least 85%, 90%, 91%, 92%, 93%, 94% or 95% by weight.

13. The composition of any one of the clauses herein, wherein the lime particles comprise at least one of quicklime, hydrated lime, or dolomitic lime.

14. The composition of any one of the clauses herein, wherein the limestone particles comprise a calcium concentration of at least 85%, 90%, 91%, 92%, 93%, 94% or 95% by weight 15. The composition of any one of the clauses herein, wherein the limestone particles comprise at least one of argillaceous limestone or dolomitic lime.

16. The composition of any one of the clauses herein, wherein the pozzolan particles comprise:
   at least 50,000 ppm, 52,000 ppm, 54,000, or 56,000 ppm potassium dioxide, and
   at least 30,000 ppm, 32,000, 34,000, or 36,000 ppm sodium dioxide.

17. The composition of any one of the clauses herein, wherein the pozzolan particles comprise:
   0-2% by weight calcium oxide,
   0-1% by weight magnesium oxide,
   0-5% by weight iron oxide,
   at least 5%, 6%, 7%, 8%, 9%, or 10% by weight aluminum oxide,
   at least 50%, 55%, 60%, 61%, 62%, 63%, 64%, or 65% silica dioxide,
   at least 50,000 ppm, 52,000 ppm, 54,000, or 56,000 ppm potassium dioxide, and at least 30,000 ppm, 32,000, 34,000, or 36,000 ppm sodium dioxide.

18. The composition of any one of the clauses herein, wherein the pozzolan particles comprise volcanic ash or zeolite.

19. The composition of any one of the clauses herein, wherein the pozzolan particles comprise calcined clay, silicate, aluminate, silica flume, or pozzolan slag, 20. The composition of any one of the clauses herein, wherein the pozzolan particles comprise bauxite residues.

21. The composition of any one of the clauses herein, wherein at least 99% of the lime particles, limestone particles, and pozzolan particles are less than 75 microns.

22. A cement blend for use in the mining industry, comprising:
   the lime-based cement extender composition of any one of the clauses herein; and cement,
   wherein the lime-based cement extender composition comprises at least 25% or 40% of the cement blend and the balance of the cement blend is the cement.

23. The cement blend of any one of the clauses herein, wherein the lime-based cement extender composition and the cement each comprises about 50% of the cement blend.

24. The cement blend of any one of the clauses herein, wherein the cement comprises of the cement blend, and the lime-based cement extender composition comprises 10-33.4% quicklime, 33.4-50% limestone, and 33.4-50% pozzolan.

25. The cement blend of any one of the clauses herein, wherein the unconfined compressive strength of the cement blend 28 days of being formed is at least 11 MPa, 12 MPa, 13 MPa, 14 MPa, 15 MPa, 16 MPa, or 17 MPa.

26. The cement blend of any one of the clauses herein, wherein the unconfined compressive strength of the cement blend 7 days of being formed is at least 8 MPa, 9 MPa, 10 MPa, 11 MPa, 12 MPa, or 13 MPa.

27. A system for producing a lime-based cement extender composition, the system comprising:
   a mill positioned to receive feed components including quicklime particles, limestone particles, and pozzolan particles, and configured to produce a milled blend by milling and blending the quicklime particles, limestone particles, and pozzolan particles; and
   a classifier downstream of the mill and positioned to receive the milled blend, the classifier comprising an outlet, a return line extending to the mill, and a separator sized such that particles above a predetermined particle size are directed to the return line and particles below a predetermined particle size are directed to the outlet.

28. The system of any one of the clauses herein, wherein the mill is a horizontal ball mill.

29. The system of any one of the clauses herein, wherein the mill is configured to reduce a moisture content of the feed components, such that the milled blend comprises a moisture content less than 5%, 4%, or 3% by weight.

30. The system of any one of the clauses herein, further comprising:
   a lime source including the quicklime particles;
   a limestone source including the limestone particles;
   a pozzolan source including the pozzolan particles; and
   conveyors extending from each of the lime source, limestone source, and the pozzolan source to the mill.

31. The system of any one of the clauses herein, wherein the classifier is configured to produce the lime-based cement extender composition of any one of the clauses herein.

32. A method for producing a lime-based cement extender composition, comprising:
   milling, via a mill, feed components comprising lime particles, limestone particles, and pozzolan particles to produce a milled blend, wherein the milled blend comprises (i) at least 10% by weight of the lime particles, (ii) at least 30% by weight of the limestone particles, and (iii) at least 30% by weight of the pozzolan particles; and
   separating oversized particles from the milled blend to produce a lime-based cement extender product such that 90% of the particles of the lime-based cement extender product pass 200 mesh.

33. The method of any one of the clauses herein, wherein separating comprises separating the oversized particles via an air classifier.

34. The method of any one of the clauses herein, wherein separating comprises separating the oversized particles via an air classifier, the method further comprising directing the milled blend to the classifier via one or more screw conveyors and bucket elevators.

35. The method of any one of the clauses herein, wherein separating comprises separating the oversized particles via an air classifier, the method further comprising:
   directing the milled blend to the classifier via one or more screw conveyors and bucket elevators; and
   directing the oversized particles from the milled blend to the mill via a return line.

36. The method of any one of the clauses herein, further comprising:
   prior to milling, weighing and conveying the lime particles from a lime source to the mill;
   prior to milling, weighing and conveying the limestone particles from a limestone source to the mill; and
   prior to milling, weighing and conveying the pozzolan particles from a pozzolan source to the mill.

37. The method of any one of the clauses herein, further comprising directing the lime-based cement extender product to a dust collector.

38. The method of any one of the clauses herein, further comprising combining cement and the lime-based cement extender product to produce a mining product, wherein the mining product comprises 40-60% of the lime-based cement extender product and 40-60% of the cement.

39. The method of any one of the clauses herein, further comprising combining cement and the lime-based cement extender product to produce a mining product that has an unconfined compressive strength that increases at least over the first 28 days from formation.

40. The method of any one of the clauses herein, further comprising combining cement and the lime-based cement extender product to produce a mining product that has an unconfined compressive strength 7 days after being formed of at least 8 MPa, 9 MPa, 10 MPa, 11 MPa, 12 MPa, or 13 MPa.

41. The method of any one of the clauses herein, further comprising combining cement and the lime-based cement extender product to produce a cement blend that has a unconfined compressive strength 7 days after being formed of at least 11 MPa, 12 MPa, 13 MPa, 14 MPa, 15 MPa, 16 MPa, or 17 MPa.

42. The method of any one of the clauses herein, wherein the milled blend comprises (i) at least 10% by weight of the lime particles, (ii) 40-45% by weight of the limestone particles, and (iii) 40-45% by weight of the pozzolan particles.

43. The method of any one of the clauses herein, wherein the lime-based cement extender product comprises:
a calcium oxide concentration of 45-65%;
a magnesium oxide concentration of 0.5-2%;
an iron oxide concentration of 0.5-2.0%
an aluminum oxide concentration of 2-8%;
a silicon dioxide concentration of 20-40%;
a potassium oxide concentration of 20,000-30,000 ppm; and
a sodium oxide concentration of 10,000-20,000 ppm.

44. The method of any one of the clauses herein, wherein the product comprises (i) at least 10% by weight lime, (ii) 40-45% by weight limestone, and (iii) 40-45% pozzolan.

The method of any one of the previous clauses, wherein the mill is a horizontal ball mill.

46. The method of any one of the previous clauses, wherein the lime particles comprise a calcium concentration of at least 85%, 90%, 91%, 92%, 93%, 94% or 95% by weight.

47. The method of any one of the previous clauses, wherein the lime particles comprise at least one of quicklime, hydrated lime, or dolomitic lime.

48. The method of any one of the previous clauses, wherein the limestone particles comprise a calcium concentration of at least 85%, 90%, 91%, 92%, 93%, 94% or 95% by weight 49. The method of any one of the previous clauses, wherein the limestone particles comprise at least one of high-calcium limestone, precipitated calcium carbonate, argillaceous limestone or dolomitic lime.

50. The method of any one of the previous clauses, wherein the pozzolan particles comprise:
at least 50,000 ppm, 52,000 ppm, 54,000, or 56,000 ppm potassium dioxide, and at least 30,000 ppm, 32,000, 34,000, or 36,000 ppm sodium dioxide.

51. The method of any one of the previous clauses, wherein the pozzolan particles comprise volcanic ash, zeolite, calcined clay, silicate, aluminate, silica flume, or pozzolan slag.

We claim:

1. A cement blend, comprising:
cement; and
a cement extender composition comprising:
lime particles comprising at least 10% by weight of the composition, and
pozzolan particles comprising at least 35% by weight of the composition,
wherein properties of the composition include (i) a magnesium oxide concentration of at least 0.5%, and (ii) an iron oxide concentration of at least 0.5%;
wherein the cement extender composition comprises at least 20% of the cement blend.

2. The cement blend of claim 1, wherein the cement blend consists of the cement and the cement extender.

3. The cementblend of claim 1, wherein the cement comprises at least 45% of the cement blend.

4. The cement blend of claim 1, wherein the cement blend does not include fly ash.

5. The cement blend of claim 1, wherein the cement extender composition comprises at least 20% limestone.

6. The cement blend of claim 1, wherein the cement extender composition comprises no more than 70% pozzolan.

7. The cementblend of claim 1, wherein, after at least 28 days of being formed, the unconfined compressive strength of the cement blend is at least 11 MPa.

8. The cement blend of claim 1, wherein, after at least 7 days of being formed, the unconfined compressive strength of the cement blend is at least 8 MPa.

9. The cement blend of claim 1, wherein at least 50% of the cement extender is less than 75 microns.

10. The cement blend of claim 1, wherein the composition does not include fly ash.

11. A composition configured to be mixed with cement, the composition comprising:
lime particles comprising more than 20% by weight of the composition; and
pozzolan particles comprising at least 35% by weight of the composition,
wherein the pozzolan particles do not include fly ash, and wherein the pozzolan particles include:
a magnesium oxide concentration of at least 0.5%;
an iron oxide concentration of at least 0.5%;
an aluminum oxide concentration of at least 2%; and
a silicon dioxide concentration of at least 20%.

12. The composition of claim 11, wherein the composition comprises at least 20% limestone.

13. The composition of claim 11, wherein the composition comprises at least 20% limestone, and wherein the limestone comprises at least one of high-calcium limestone, precipitated calcium carbonate, argillaceous limestone or dolomitic limestone.

14. The composition of claim 11, wherein at least 50% of the composition is less than 75 microns.

15. The composition of claim 11, wherein the lime particles comprise a calcium concentration of at least 90% by weight.

16. A composition configured to be mixed with cement, the composition comprising:
limestone particles;
lime particles comprising at least 10% by weight of the composition; and
pozzolan particles comprising at least 35% by weight of the composition,
wherein the pozzolan particles include (i) a magnesium oxide concentration of at least 0.5%, and (ii) an iron oxide concentration of at least 0.5%.

17. The composition of claim 16, wherein at least 50% of the composition is less than 75 microns.

* * * * *